(12) United States Patent
     Wickersty

(10) Patent No.: US 6,247,518 B1
(45) Date of Patent: Jun. 19, 2001

(54) WINDOW COVER SYSTEM FOR VEHICLES

(76) Inventor: William R. Wickersty, 19838 Blue Jay Trail Cir., Lawson, MO (US) 64062

( * ) Notice: Subject to any disclaimer, the term of this patent is extended or adjusted under 35 U.S.C. 154(b) by 0 days.

(21) Appl. No.: 09/181,493

(22) Filed: Oct. 28, 1998

(51) Int. Cl.[7] ....................................................... B60J 1/08
(52) U.S. Cl. ..................................... 160/105; 160/370.21
(58) Field of Search .............................. 160/105, 370.21, 160/92, 96, 97, 102

(56) References Cited

U.S. PATENT DOCUMENTS

| D. 335,856 | 5/1993 | Sazama . |
| D. 336,458 | 6/1993 | D'Alessandro . |
| D. 344,920 | 3/1994 | McGruder et al. . |
| D. 355,880 | 2/1995 | Roberts . |

(List continued on next page.)

Primary Examiner—David M. Purol
(74) Attorney, Agent, or Firm—Chase & Yakimo, L.C.

(57) ABSTRACT

An automotive window cover system comprises a windshield shade having a plurality of panels which jointly cover the extent of the windshield. Fastener strips are releasably joined along the joints between the adjacent panels so as to maintain the panels in place. First and second struts are pivotally attached to each upper panel and engage knobs on the lower panels so as to span the panels and provide rigidity thereto. The system further comprises a side window panel adapted to fit within the frame about a side window of a vehicle. The side window panel includes screened apertures therein and sub-panels which releasably cover such apertures. Removal of the sub-panels allows for passage of air through the screened apertures. A rear vent window shade fits within the rear vent window frame and includes a screen normally extending from the perimeter. Upon opening the rear vent window the screen bridges the gap between the open rear vent window and the vehicle to preclude passage of elements, e.g., insects, therethrough. An alternative embodiment presents a bead adapted for engagement of the edge of the rear vent window with the screen extending from the beads so as to close the opening. The screens can be collectively used as part of the system or individually according to the desires of the user.

6 Claims, 2 Drawing Sheets

U.S. PATENT DOCUMENTS

| | | |
|---|---|---|
| D. 375,068 | 10/1996 | Lund . |
| D. 375,069 | 10/1996 | Yates et al. . |
| 1,545,224 | 7/1925 | Whealdon . |
| 1,627,975 | 5/1927 | Kempton et al. . |
| 1,675,909 | 7/1928 | Riker . |
| 2,223,477 | 12/1940 | Bernier . |
| 2,546,609 | 3/1951 | Morris . |
| 2,665,754 | 1/1954 | Claussen et al. . |
| 2,804,135 | 8/1957 | Sutton . |
| 2,850,087 | 9/1958 | Janaman . |
| 2,881,831 | 4/1959 | Knodel, Jr. . |
| 3,126,052 | 3/1964 | Tonnon . |
| 3,166,116 * | 1/1965 | Cole ................. 160/105 X |
| 3,175,603 | 3/1965 | Tonnon . |
| 3,303,769 | 2/1967 | Williams . |
| 3,587,706 | 6/1971 | Widmer . |
| 3,670,798 * | 6/1972 | Hess et al. ............ 160/105 X |
| 3,751,100 | 8/1973 | Keyes . |
| 3,753,458 | 8/1973 | Lazarek . |
| 3,805,872 | 4/1974 | Lorber . |
| 4,272,934 | 6/1981 | Cowden et al. . |
| 4,353,593 | 10/1982 | Henson . |
| 4,395,939 * | 8/1983 | Hough et al. ............ 160/92 X |
| 4,398,586 | 8/1983 | Hall . |
| 4,463,790 | 8/1984 | Clapsaddle . |
| 4,544,587 | 10/1985 | Nesbitt . |
| 4,562,675 | 1/1986 | Baigas, Jr. et al. . |
| 4,756,242 | 7/1988 | Keith . |
| 4,759,581 | 7/1988 | McNamee . |
| 4,790,591 | 12/1988 | Miller . |
| 4,799,422 | 1/1989 | Birt . |
| 4,862,943 * | 9/1989 | Shafia ............... 160/370.21 |
| 4,867,222 | 9/1989 | Roman et al. . |
| 4,991,349 | 2/1991 | Barthelemy . |
| 4,993,471 | 2/1991 | Golden . |
| 4,997,226 * | 3/1991 | Grimes ................ 296/39.1 |
| 5,014,607 | 5/1991 | Johnson . |
| 5,042,551 | 8/1991 | Ein et al. . |
| 5,094,151 | 3/1992 | Bernard . |
| 5,121,957 | 6/1992 | O'Shea . |
| 5,183,094 | 2/1993 | Montasham et al. . |
| 5,253,695 | 10/1993 | Nenstiel . |
| 5,299,616 * | 4/1994 | Sholtz ................ 160/105 X |
| 5,379,822 | 1/1995 | Lenetz . |
| 5,423,589 | 6/1995 | Pank . |
| 5,465,776 | 11/1995 | Mirza . |
| 5,489,136 | 2/1996 | Pank . |
| 5,509,713 | 4/1996 | Hou . |
| 5,570,735 | 11/1996 | Chu . |
| 5,575,524 | 11/1996 | Cronk . |
| 5,678,882 * | 10/1997 | Hammond ............. 160/105 X |
| 5,732,759 | 3/1998 | Wang . |

\* cited by examiner

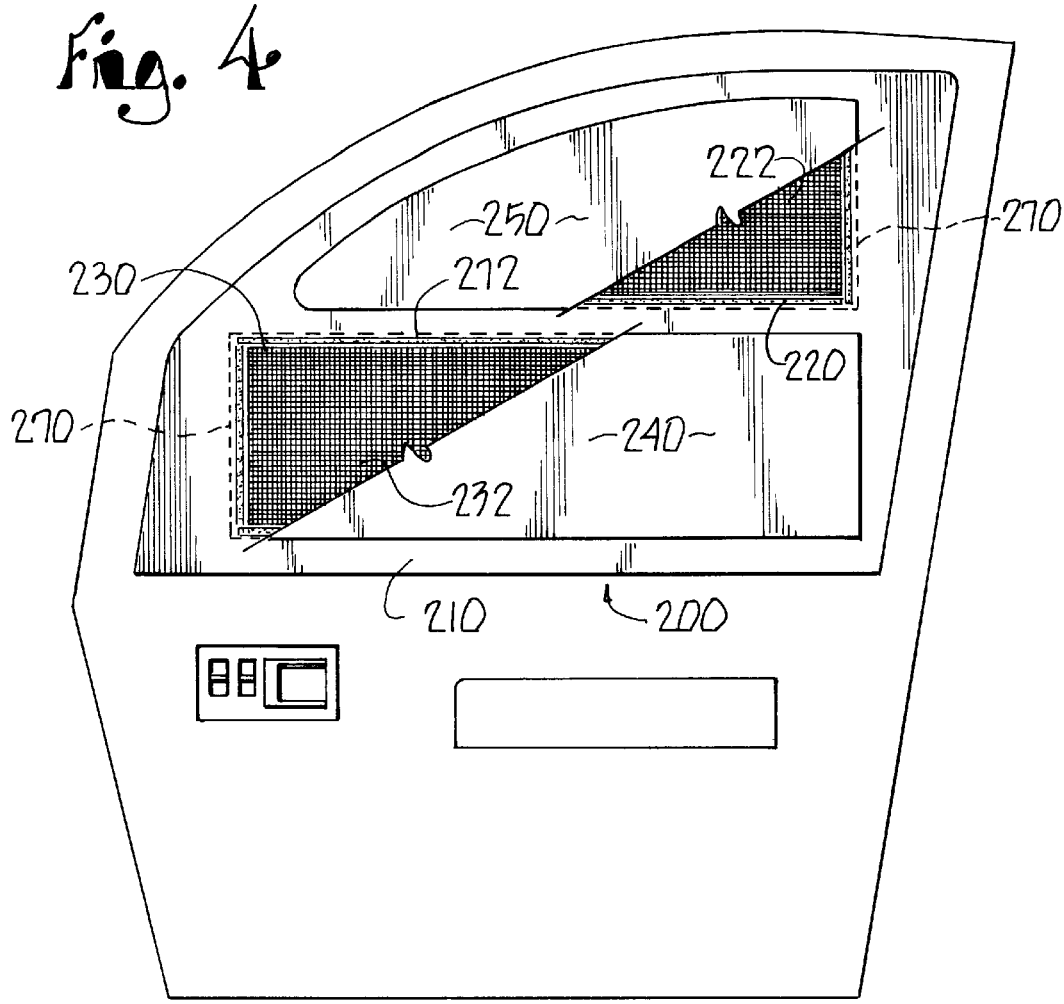
Fig. 4
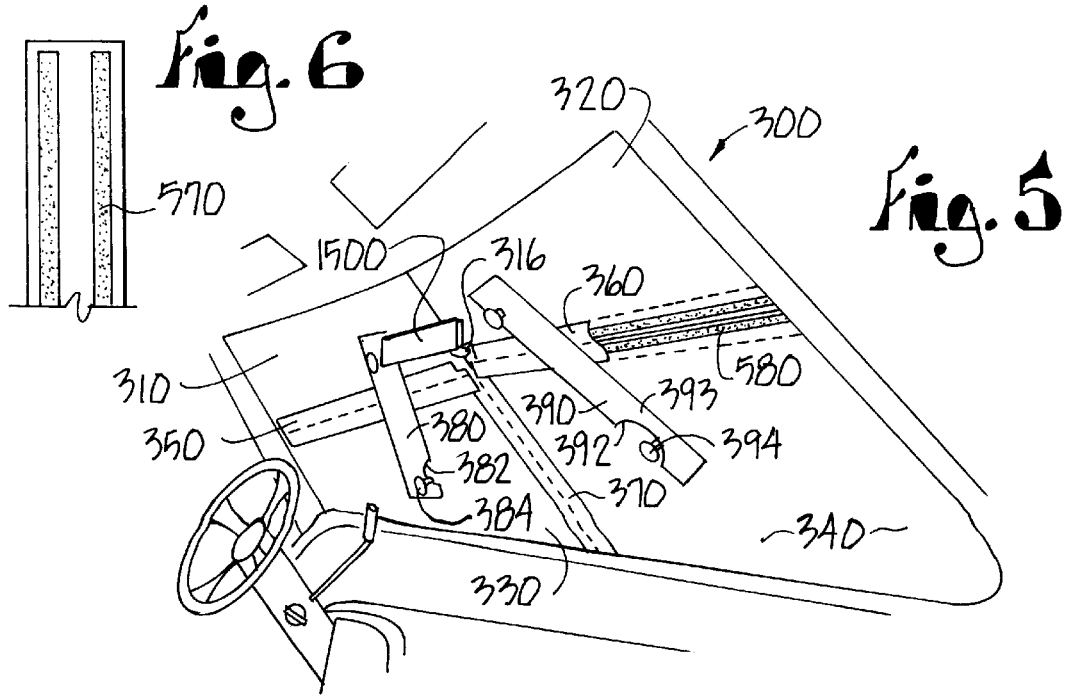
Fig. 6
Fig. 5

WINDOW COVER SYSTEM FOR VEHICLES

BACKGROUND OF THE INVENTION

This invention relates to a window cover system for vehicles and, more particularly, to a system including privacy, ventilating and screen type window shades particularly adapted for van use.

Various types of window covers for autos have been proposed for precluding entry of sunlight therethrough. Also, various types of screens for use in connection with vehicle windows have also been proposed. It is thus desirable to have a cover system which provides shading/privacy, ventilation and screening functions. These functions are desirable particularly when a vehicle is being utilized in a camping environment.

It is noted that various types of vehicles now have rear side windows of a vent-type construction. These windows pivot about a vertical axis between closed and open positions to allow ventilation therethrough. Heretofore, no type of window shade has been found which is particularly adapted to provide privacy and/or screen functions to such a window type. Furthermore, in connection with such a system it is desirable to have a window shade particularly adapted for windshield use.

In response thereto I have devised a window cover system comprising a windshield shade, side window shade with user-selectable ventilating capabilities and a rear vent Window shade having a window screen capability. Each shade is designed to fit into the frame surrounding the appropriate window so as to provide a privacy function. The side window shades have screened openings therein which can be covered/uncovered to selectably allow ventilation therethrough. The rear vent window shade includes a screen extending from the perimeter of the shade and to the vehicle so as to bridge the gap between the window and vehicle. The screen which precludes the passage of insects through this opening. Alternatively, I provide a screen which is easily fitted about the edge of the vent window so as to provide a screening function when the rear vent window is in an open position.

BRIEF DESCRIPTION OF THE DRAWINGS

FIG. 4 is a side elevation view showing a side window shade in place with a portion of the releasable sub-panels broken away to show the underlying screened apertures;

FIG. 5 shows the front windshield shade; and

FIG. 6 is a bottom fragmentary view of a strip fastener of the FIG. 5 windshield shade with the Velcro® fastener elements thereon.

DESCRIPTION OF THE PREFERRED EMBODIMENT

Turning more particularly to the drawings, FIGS. 1–6 show the elements of a cover system for use collectively or singularly on a vehicle.

Figure 1:
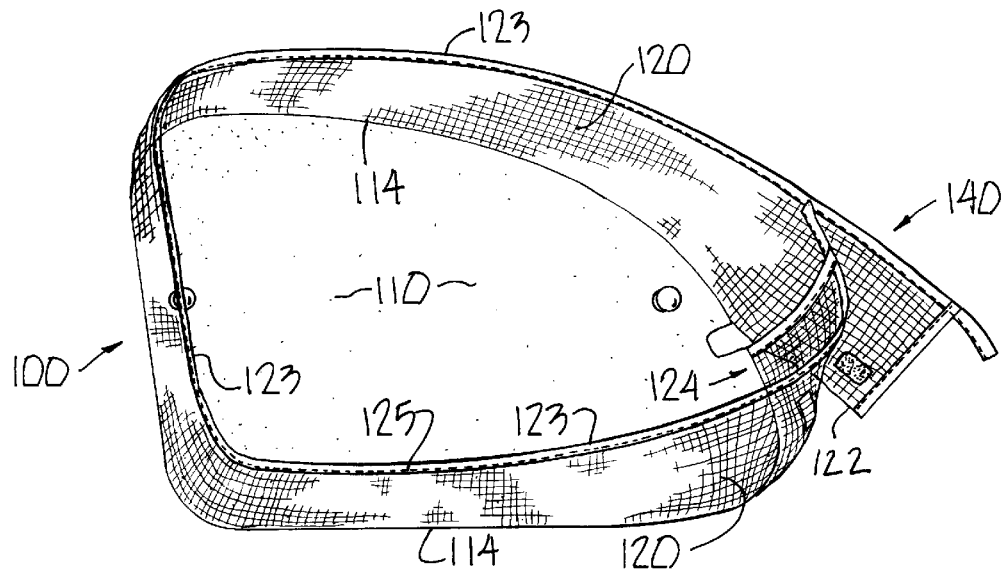
FIG. 1 shows the rear view vent window cover with screen attached there

As such, FIG. 1 shows a shade 100 particularly adapted for use with a vent window of a passenger vehicle. It is known that certain vehicles presently have rear vent windows which pivot about a vertical axis between a closed position and an open (FIG. 2) position. At the open position the window 1000 is displaced from the body of the vehicle 2000 so as to present a gap therebetween.

The rear vent shade 100 comprises a generally lightweight, opaque panel 110 for precluding passage of light therethrough. The configuration of the panel 110 is chosen such that it presents an edge 114 which will fit into the frame 1100 surrounding the rear vent window 1000.

A groove extends about the edge 114 of the panel 110. An edge of the screen 120 seats in this groove. A length of nylon string is then seated into the groove atop the edge of the screen 120. The string is tightened and tied at its ends to secure the edge of the screen in the groove. Thus, extending from the perimetrical edge 114 of the panel 110 is a flexible screen 120 having a width sufficient to extend from the open rear vent window 100 and into the vehicle 2000. Screen 120 thus bridges the gap presented between the open rear vent window 100 and the vehicle 2000. The free edge of screen 120 has a binding 123 with wire 125 therealong to reinforce the same. As shown, the screen 120 presents first 122 and second 124 overlapping ends at juncture 140. Such overlap allows for adjustment to screen 120 and the flexibility thereof.

Panel 110 is fitted into the rear vent window frame 1100 so as to provide a privacy screen. Upon opening the rear vent window 1000 the screen 120 is user manipulated so as to extend from the panel and into the window opening 1200 in the vehicle. The screen 120 is manipulated by the user so as to assure that the resulting gap is bridged by the screen 120. Thus, the panel 100 precludes the entry of any insects into the vehicle while providing a privacy function.

Figure 7:
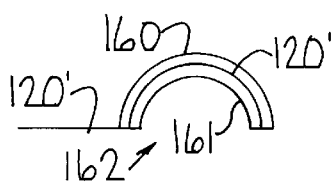
FIG. 7 is a diagrammatic cross section view, on an enlarged scale, of the bead of the FIG. 3 embodiment with screen edge and tape thereon.
Figure 2:
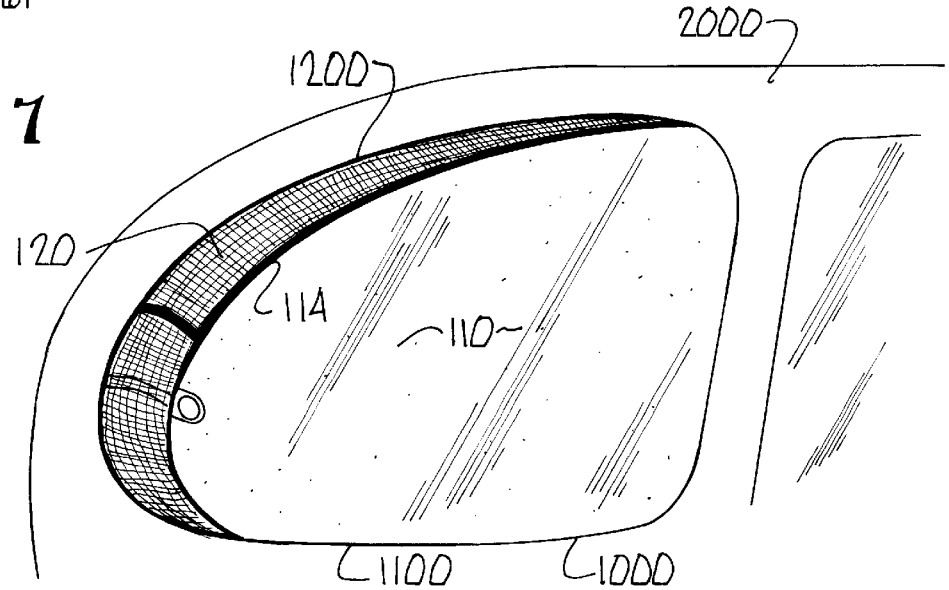
FIG. 2 diagrammatically shows the FIG. 1 device in place on an open rear vent window.
Figure 3:
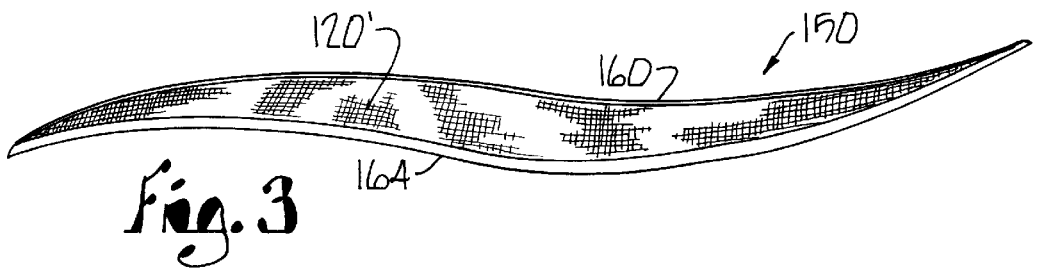
FIG. 3 is a top diagrammatic view showing an alternative form of screen found in the FIG. 1 device.

FIG. 3 shows an alternative embodiment 150 which presents a screen 120' only for placement about the window 1000. This embodiment 150 includes a flexible, resilient bead 160 which has a slot 162 therealong. As diagrammatically shown in FIG. 7, an edge of screen 120' is glued and baked onto the interior of the bead 160. Adhesive masking tape 161 is then placed atop the screen edge to prevent the glue from adhering to the window. Screen 120' further presents a reinforced edge 164 by means of a binding 164 sewn thereto. The length of the device 150 is such that the bead 160 will fit along the window edge 1100. Slot 162 allows for the bead 160 to compress/fit about the edge 1100 of the rear vent window itself with the screen 120' extending therefrom. In this embodiment the privacy function is not provided. However, the screen 120' can be manipulated to bridge the gap presented by the open rear vent window.

Although not shown, it is understood that the free edge 164, 164' of the screen 120, 120' in either embodiment may be fixed to the interior of the vehicle such that the screen will extend and collapse with the window movement. Thus, user, manipulation will not be necessary.

FIG. 4 shows a second shade 200 which comprises an opaque panel 210 precluding the passage of light therethrough. The perimeter of the panel 210 is chosen such that it will snap fit into the frame surrounding the side window of the vehicle. Panel 210 includes first and second apertures 220, 230 having screens 222, 232 therein. Covering each aperture 220, 230 is a releasable sub-panel 240, 250. Each sub-panel 240, 250 has one element of a Velcro® fastener combination about its perimeter which engages the appropriate complementary Velcro® element 272 extending about the perimeter of each aperture 220, 230. Accordingly, upon fitting the panel 210 into the window frame a privacy function is provided. Shade 200 may be used either with the side window in an up or down position. If ventilation is desired the side window of the vehicle is lowered and the appropriate sub-panels 240, 250 are removed from the panel 210 so as to allow air to pass through the screened apertures 220, 230.

FIG. 5 shows a front windshield panel 300. The front windshield panel 300 comprises a plurality of upper 310, 320 and lower 330, 340 sub-panels so as to ease installation and transport. As shown, the plurality of panels when joined along their edges will provide a privacy to the vehicle's windshield. Fastener strips 350, 360, 370 are releasably engaged along the joints between the appropriate adjacent sub-panels so as to hold the adjacent sub-panels together at these joints. The fastener strips have Velcro® fasteners 570 which engage complementary fasteners 580 on the panels.

Further extending between the upper sub-panels and lower sub-panels 330, 340 are struts 380, 390 pivotally mounted at one end on the respective upper sub-panel 310, 320. At the lower end of each strut 380, 390 is a notch 382, 392 having sub-notches 393. The larger notches 382, 392 allow for a first adjustment such that the sub-notches 393 engage 5/16" collars which displace the knobs 384, 394 from the sub-panels 340, 350. Upon the respective sub-notches 393 engaging the knobs on the lower sub-panels, the spanning struts 380, 390 provide rigidity to the underlying sub-panels. The sub-panels further present a notch 316 between sub-panels 310, 320 which allows for extension of the rear view mirror 1500 therethrough. Accordingly, panel 300 provides a privacy function to the front windshield which is maintained in place but easily disassembled for transport.

It is understood that a system is presented which includes a plurality of panels 100, 200, 300 as above described such that each panel can be used either as part of the system or individually according to the situation at hand.

It is to be understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A device adapted for use with a vent window movable in and out of a vent window opening of a vehicle comprising:
   a first panel of material, said panel having a configuration presenting a perimetrical edge adapted to fit within a frame surrounding a vent window;
   a band of flexible screen having a first edge laterally extending about said panel edge and a second edge displaced from said first edge with said band of screen extending therebetween;
   a groove about said edge of said panel, said groove adapted to receive said first edge of said screen band therein; and
   means for securing said first edge of said screen band in said groove;
   said band adapted to extend from said panel and across a gap presented between an open vent window and a vehicle, whereby a positioning of said second edge about a perimeter of a vent window opening in a vehicle causes said screen band to bridge the gap to preclude the passage of selected elements through said gap and into the vehicle.

2. The device as claimed in claim 1 wherein said panel material limits a passage of light through the vent window.

3. The device as claimed in claim 1 wherein said securing means comprises a cord seated in said groove and atop said first edge of said screen therein.

4. A vent window of a vehicle movable in and out of a vent window opening comprising:
   a band of screen having a first edge tracing a perimeter thereof of the vent window of said vehicle, said screen band reinforced to laterally extend from said first edge and away from the vent window upon attachment of said first edge thereto;
   means for attaching said screen first edge to the perimeter of the vent window of said vehicle to extend said lateral band of screen away from said vent window and about a perimeter of the vent window opening in said vehicle, whereby said lateral screen band precludes passage of selected elements therethrough and into the window opening of the vehicle.

5. A vent window of a vehicle movable in and out of an opening comprising:
   a band of a screen material presenting a first edge circumscribing an edge of the vent window, said band presenting a second edge displaced from said first edge;
   means for attaching said band first edge about a perimeter thereof of the vent window, said second band edge extending away from said first edge upon said attaching, whereupon an opening of the vent window presents a space between the vent window and the vent window opening in the vehicle, said second edge of said screen adapted to be manipulated by a user for placement about the perimeter of the vent window opening whereby to bridge said space with said screen band for precluding passage of elements through said screen band and into the vehicle.

6. A device adapted for use with a vent window movable in and out of a vent window opening of a vehicle comprising:
   a first panel of material, said panel having a configuration presenting a perimetrical edge adapted to fit within a frame surrounding a vent window;
   a band of flexible screen having a first edge laterally extending about said panel edge and a second edge displaced from said first edge with said band of screen extending therebetween, said band adapted to extend from said panel and across a gap presented between an open vent window and a vehicle;
   a reinforcing wire about said screen band to maintain said lateral extension of said screen whereby a positioning of said second edge about a perimeter of a vent window opening in a vehicle causes said screen band to bridge the gap to preclude the passage of selected elements through said gap and into the vehicle.

* * * * *